(12) United States Patent
McConnell

(10) Patent No.: US 8,915,139 B1
(45) Date of Patent: Dec. 23, 2014

(54) RELAXOR-BASED PIEZOELECTRIC SINGLE CRYSTAL ACCELEROMETER

(75) Inventor: James A. McConnell, Clinton, CT (US)

(73) Assignee: Applied Physical Sciences Corp., Groton, CT (US)

(*) Notice: Subject to any disclaimer, the term of this patent is extended or adjusted under 35 U.S.C. 154(b) by 249 days.

(21) Appl. No.: 13/045,969

(22) Filed: Mar. 11, 2011

Related U.S. Application Data

(60) Provisional application No. 61/313,442, filed on Mar. 12, 2010.

(51) Int. Cl.
*G01P 15/09* (2006.01)

(52) U.S. Cl.
USPC ..................... 73/514.34; 73/514.36

(58) Field of Classification Search
USPC ...................... 73/514.34, 514.33, 777, 514.36
See application file for complete search history.

(56) References Cited

U.S. PATENT DOCUMENTS

| | | | | |
|---|---|---|---|---|
| 2,722,614 A * | 11/1955 | Fryklund | ...................... | 310/329 |
| 3,186,237 A * | 6/1965 | Forrest | ...................... | 73/514.34 |
| 4,333,029 A * | 6/1982 | Kolm et al. | ................... | 310/329 |
| 4,709,359 A * | 11/1987 | Loftin | .......................... | 367/155 |
| 5,229,680 A * | 7/1993 | Sato et al. | ..................... | 310/339 |
| 5,425,750 A * | 6/1995 | Moberg | .......................... | 607/19 |
| 5,512,794 A * | 4/1996 | Kubler et al. | ................. | 310/329 |
| 5,804,907 A * | 9/1998 | Park et al. | ..................... | 310/358 |
| 5,833,713 A * | 11/1998 | Moberg | .......................... | 607/19 |
| 6,674,222 B2 * | 1/2004 | Masters et al. | ................ | 310/359 |
| 6,715,363 B1 * | 4/2004 | Deng et al. | ...................... | 73/782 |
| 6,888,291 B2 * | 5/2005 | Arbogast et al. | .............. | 310/331 |
| 7,021,141 B1 * | 4/2006 | Nilsson et al. | ............. | 73/514.29 |
| 7,104,140 B2 * | 9/2006 | Zou et al. | ........................ | 73/777 |
| 7,224,106 B2 * | 5/2007 | Pei et al. | ......................... | 310/311 |
| 2002/0090517 A1 * | 7/2002 | Zhang et al. | .................. | 428/421 |
| 2003/0062808 A1 * | 4/2003 | Masters et al. | ................ | 310/359 |
| 2003/0119220 A1 * | 6/2003 | Mlcak et al. | .................... | 438/52 |
| 2005/0034519 A1 * | 2/2005 | Deng | ......................... | 73/514.34 |
| 2007/0119259 A1 * | 5/2007 | Zou et al. | ........................ | 73/777 |
| 2008/0072671 A1 * | 3/2008 | Eller et al. | ................. | 73/514.34 |
| 2008/0072677 A1 * | 3/2008 | Rhee et al. | ...................... | 73/652 |
| 2009/0194732 A1 * | 8/2009 | Luo et al. | ............... | 252/62.9 PZ |

\* cited by examiner

*Primary Examiner* — Helen Kwok
(74) *Attorney, Agent, or Firm* — Ryan, Mason & Lewis, LLP

(57) ABSTRACT

A cantilever beam accelerometer design is disclosed that obviates the need of attaching electrical leads directly to the piezoelectric plates. According to one aspect of the invention, two identical proof-masses are positioned on top of each piezoelectric plate in a symmetrical fashion. In advance of attaching the masses to the plates, electrical leads are attached to the masses by some suitable technique such as soldering. Each proof-mass is positioned on its respective piezoelectric plate as close to the free-end of the beam as practical, to keep the size of the mass reasonably small. The disclosed concept is useful for both series and parallel configurations of the piezoelectric plates, wherein the polarization vectors are in opposite directions for two plates connected in series and the polarization vectors are in the same direction for two plates connected in parallel.

18 Claims, 2 Drawing Sheets

RELAXOR-BASED PIEZOELECTRIC SINGLE CRYSTAL ACCELEROMETER

CROSS-REFERENCE TO RELATED APPLICATIONS

This application claims the benefit of U.S. Provisional Application No. 61/313,442, filed Mar. 12, 2010, incorporated by reference herein.

GOVERNMENT INTEREST

The present invention was made in connection with work performed under United States Navy Office of Naval Research Contract N00014-07-M-0316 and N00014-09-C-0096.

FIELD OF THE INVENTION

The present invention relates generally to flexural mode accelerometers that employ relaxor-based piezoelectric single crystal transduction elements which are used in applications related to the measurement of structureborne and fluidborne sound.

BACKGROUND OF THE INVENTION

Piezoelectric accelerometers of various designs have been used for decades in connection with structureborne and fluidborne sound measurements. A broad set of applications where they have been used include vibration monitoring of machinery, shock evaluation of structures, seismic sensing, and underwater acoustic surveillance. When low frequency applications are considered (e.g., frequencies below 10 kHz) flexural mode accelerometers are often used because they have excellent performance characteristics and can be fabricated in a reasonably straightforward manner. High frequency applications are better served with compression and shear mode accelerometers because the resonance frequency of such devices is typically in the ultrasonic frequency range and therefore facilitates a flat receiving sensitivity over a relatively large bandwidth. For a general discussion on the basic operating principles of accelerometers, refer to G. Gautschi, Piezoelectric Sensorics: Force, Strain, Pressure, Acceleration, and Acoustic Emission Sensors, Materials and Amplifiers (Springer, Berlin, 2006) pp. 167-197, incorporated by reference herein.

Historically speaking, the most pervasive flexural mode accelerometer design is the so-called trilaminar piezoelectric cantilever beam in which a sensing structure comprised of a fixed-free metal beam outfitted with a pair of piezoelectric plates is used to convert dynamic motion to an output voltage that can be processed and displayed to glean useful information about a measurement. Depending on the design, a proof-mass may optionally be included at the free end of the beam so that the operational bandwidth and sensitivity are tuned to specific values. Examples of devices that utilize cantilever beam accelerometers include those described in U.S. Pat. Nos. 2,722,614, 4,333,029, and 4,709,359, each incorporated by reference herein. In all cases it is important to note that the piezoelectric plates associated with these devices comprise a polycrystalline ceramic composition such as lead zirconate titanate (PZT) and the electrical signal is routed from the transducer to the processing electronics/instrumentation using wires that are in intimate electrical contact (e.g., soldered) with the piezoelectric plates.

In the late 1990's, researchers discovered that relaxor-based piezoelectric single crystal materials had superior elasto-piezo-dielectric properties to those of polycrystalline ceramics. Initially, binary formulations comprised of lead magnesium niobate-lead titanate (PMN-PT) and lead zinc niobate-lead titanate (PZN-PT) were developed, but later on ternary compounds comprised of lead magnesium niobate-lead indium niobate-lead titanate (PMN-PIN-PT) and lead magnesium niobate-lead zirconate-lead titanate (PMN-PZ-PT) were developed. Eventually, practical devices containing single crystal transduction elements were made and included a trilaminar cantilever beam accelerometer, such as the one disclosed in U.S. Pat. No. 7,104,140 B2, incorporated by reference herein. Here it is noted that the accelerometer described in this patent contains <011> poled PMN-PT transduction elements and a proof-mass.

All of the research performed to date indicates that one of the main drawbacks of using single crystal materials concerns the undesirable change in the crystal structure and/or depolarization that can occur at moderately elevated temperatures. For example, in binary formulations the rhombohedral-to-tetragonal transition temperature $T_{rt}$ is typically less than 110° C. and the Curie temperature $T_c$ is typically less than 150° C. Moreover, in ternary formulations $T_{rt}$ and $T_c$ moderately exceed 110° C. and 150° C., respectively. So far, none of the research performed to date indicates that conventional soldering techniques can be used in connection with attaching electrical leads to single crystal transduction elements. This is because most solders need to be heated to over 250° C. in order to form satisfactory electrical connections. In contrast, the Curie temperature for most piezoelectric ceramic materials is at least 300° C., therefore conventional and advanced soldering techniques can be employed for ceramic-based transducers. For the case of single crystal transducers, special low temperature solder, conductive epoxy, or novel electroding techniques are required to resolve this issue. These steps are invariably cost-prohibitive and time-consuming.

For a discussion regarding the temperature characteristics associated with binary and ternary single crystal materials, see for example, U.S. Pat. No. 20090194732 A1 and C. H. Sherman and J. L. Butler, Transducers and Arrays for Underwater Sound (Springer, New York, 2007), pp. 552-553, each incorporated by reference herein.

SUMMARY OF THE INVENTION

The object of the present invention is to illustrate a novel cantilever beam accelerometer design that obviates the need of attaching electrical leads directly to the piezoelectric plates. That is, in prior embodiments, such as that presented in U.S. Pat. No. 7,104,140 B2, the proof-mass has traditionally been located at the free-end of the beam. In the present invention two identical proof-masses are positioned on top of each piezoelectric plate in a symmetrical fashion. In advance of attaching the masses to the plates, electrical leads are attached to the masses by some suitable technique such as soldering. Here it is noted that each proof-mass is positioned on its respective piezoelectric plate as close to the free-end of the beam as practical. In this way the size of the mass can be kept reasonably small in order to achieve the same resonance frequency relative to the case of positioning the proof-mass at the free-end of the beam. This feature also keeps the beam from becoming overly stiff since most of the bending, and hence the strain energy responsible for generating the output voltage, occurs in the region close to the fixed-end of the beam. This concept is useful for both series and parallel configurations of the piezoelectric plates, wherein the polarization vectors are in opposite directions for two plates connected in series and the polarization vectors are in the same direction for two plates connected in parallel.

A more complete understanding of the present invention, as well as further features and advantages of the present invention, will be obtained by reference to the following detailed description and drawings.

DETAILED DESCRIPTION

Figure 1:
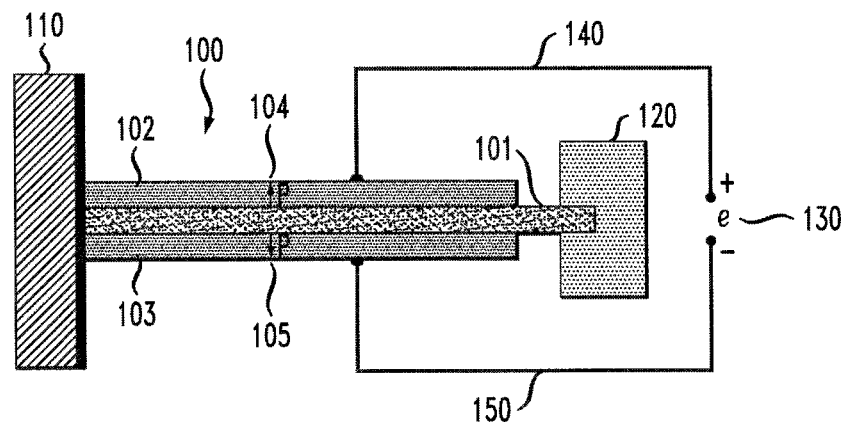
FIG. 1 presents an elevation section drawing of a series-connected piezoelectric cantilever beam accelerometer that is representative of the prior art.

FIG. 1 presents an elevation section drawing of a series-connected piezoelectric cantilever beam accelerometer that is representative of the prior art and shows that trilaminar structure 100 is fixed at one end to base 110 and free at the other end wherein proof-mass 120 is attached. The trilaminar structure comprises metal beam 101 whose top and bottom surfaces are electrically connected to piezoelectric plates 102 and 103 using electrically conductive epoxy or some other suitable technique. The piezoelectric plates are made from a relaxor-based single crystal material, employ metalized electrodes on their active surfaces, and have opposite polarity as indicated by polarization vectors 104 and 105. Dynamic forces or acceleration imparted to base 110 cause trilaminar structure 100 to exhibit transverse bending motion which generates open-circuit output voltage 130. Open-circuit output voltage 130 is measured across electrical leads 140 and 150 which are electrically connected to piezoelectric plates 102 and 103 using electrically conductive epoxy or some other suitable technique.

Figure 2:
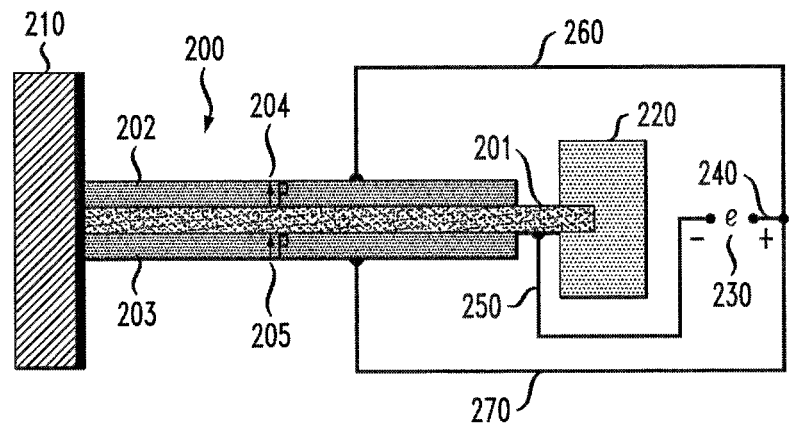
FIG. 2 presents an elevation section drawing of a parallel-connected piezoelectric cantilever beam accelerometer that is representative of the prior art.

FIG. 2 presents an elevation section drawing of a parallel-connected piezoelectric cantilever beam accelerometer that is representative of the prior art and shows that trilaminar structure 200 is fixed at one end to base 210 and free at the other end wherein proof-mass 220 is attached. The trilaminar structure comprises metal beam 201 whose top and bottom surfaces are electrically connected to piezoelectric plates 202 and 203 using electrically conductive epoxy or some other suitable technique. The piezoelectric plates are made from a relaxor-based single crystal material, employ metalized electrodes on their active surfaces, and have the same polarity as indicated by polarization vectors 204 and 205. Dynamic forces or acceleration imparted to base 210 cause trilaminar structure 200 to exhibit transverse bending motion and generate open-circuit output voltage 230 which is measured across electrical leads 240 and 250. Electrical lead 240 is electrically connected to piezoelectric plates 202 and 203 via electrical leads 260 and 270, respectively. Electrical lead 250 is electrically connected to metal beam 201. Said electrical connections are achieved using electrically conductive epoxy or some other suitable technique.

Figure 3:
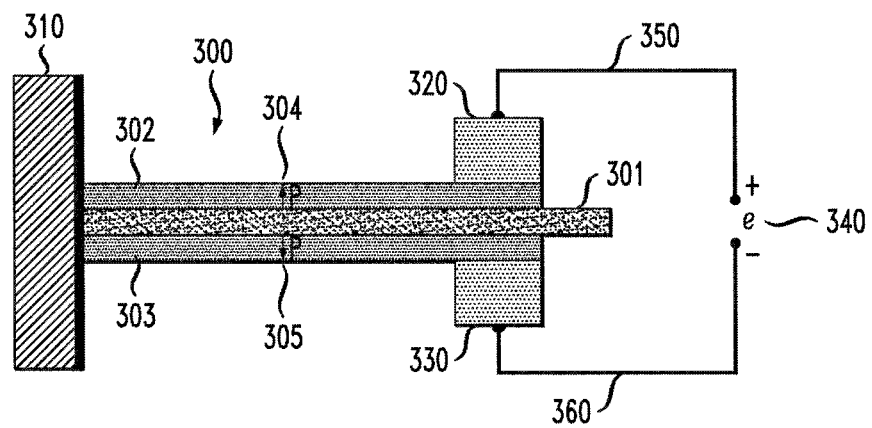
FIG. 3 presents an elevation section drawing of a series-connected piezoelectric cantilever beam accelerometer that is representative of the present invention.

FIG. 3 presents an elevation section drawing of a series-connected piezoelectric cantilever beam accelerometer that is representative of the present invention and shows that trilaminar structure 300 is fixed at one end to base 310 and free at the other end. The trilaminar structure comprises metal beam 301 whose top and bottom surfaces are electrically connected to piezoelectric plates 302 and 303 using electrically conductive epoxy or some other suitable technique. The piezoelectric plates are made from a relaxor-based single crystal material, employ metalized electrodes on their active surfaces, and have opposite polarity as indicated by polarization vectors 304 and 305. Identical proof-masses 320 and 330 are electrically connected to piezoelectric plates 302 and 303, wherein they are positioned as close to the free-end of the beam as practical and are disposed in a symmetrical manner to each other. Said electrical connections are achieved using electrically conductive epoxy or some other suitable technique. Dynamic forces or acceleration imparted to base 310 cause trilaminar structure 300 to exhibit transverse bending motion and generate open-circuit output voltage 340. Open-circuit output voltage 340 is measured across electrical leads 350 and 360 which are electrically connected to piezoelectric plates 302 and 303, via proof-masses 320 and 330, respectively. The electrical connections to proof-masses 320 and 330 are performed by using a conventional soldering technique in advance of attaching the proof-masses to piezoelectric plates 302 and 303. In this way the electrical connections are made quickly and do not compromise the integrity of the piezoelectric plates due to elevated temperature. This is particularly important when the piezoelectric plates are made from either a binary or ternary relaxor-based single crystal transduction material.

Figure 4:
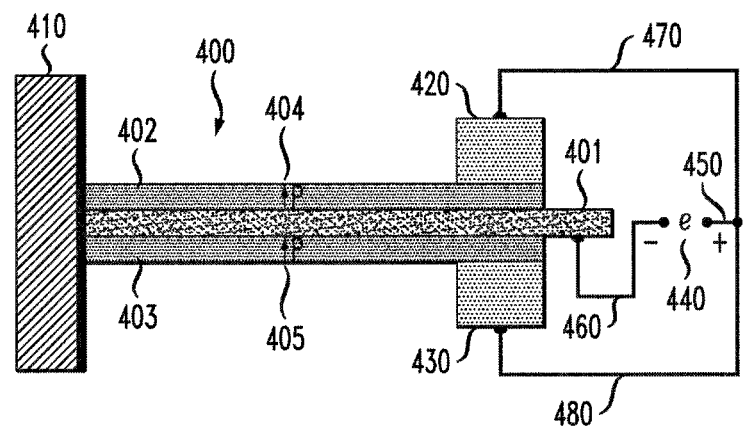
FIG. 4 presents an elevation section drawing of a parallel-connected piezoelectric cantilever beam accelerometer that is representative of the present invention.

FIG. 4 presents an elevation section drawing of a parallel-connected piezoelectric cantilever beam accelerometer that is representative of the present invention and shows that trilaminar structure 400 is fixed at one end to base 410 and free at the other end. The trilaminar structure comprises metal beam 401 whose top and bottom surfaces are electrically connected to piezoelectric plates 402 and 403 using electrically conductive epoxy or some other suitable technique. The piezoelectric plates are made from a relaxor-based single crystal material, employ metalized electrodes on their active surfaces, and have the same polarity as indicated by polarization vectors 404 and 405. Identical proof-masses 420 and 430 are electrically connected to piezoelectric plates 402 and 403, wherein they are positioned as close to the free-end of the beam as practical, and are disposed in a symmetrical manner to each other. Said electrical connections are achieved using electrically conductive epoxy or some other suitable technique. Dynamic forces or acceleration imparted to base 410 cause trilaminar structure 400 to exhibit transverse bending motion and generate open-circuit output voltage 440 which is measured across electrical leads 450 and 460. Electrical lead 450 is electrically connected to piezoelectric plates 402 and 403 via proof-masses 420 and 430 using electrical leads 470 and 480, respectively. Electrical lead 460 is electrically connected to metal beam 401. The electrical connections to the proof-masses are performed using a conventional soldering technique in advance of attaching the proof-masses to piezoelectric plates 402 and 403. The electrical connection to metal beam 401 is performed using a conventional soldering technique in advance of attaching piezoelectric plates 402 and 403 to the beam. In this way the electrical connections are made quickly and do not compromise the integrity of the piezoelectric plates due to elevated temperature. This is particularly important when the piezoelectric plates are made from either a binary or ternary relaxor-based single crystal transduction material.

It is to be understood that the embodiments and variations shown and described herein are merely illustrative of the principles of this invention and that various modifications may be implemented by those skilled in the art without departing from the scope and spirit of the invention.

I claim:

1. A series-connected cantilever beam accelerometer comprising:
   a metal beam;
   two proof masses, wherein said two proof-masses are positioned substantially close to a free-end of the metal beam; and
   two relaxor-based piezoelectric single crystal transduction elements, wherein each of said transduction elements is conductively bonded to a corresponding proof mass and wherein said corresponding proof mass comprises an additional electrical connection to at least one electrical lead, such that said at least one electrical lead is indirectly electrically connected to said corresponding transduction element via said corresponding proof mass.

2. The series-connected cantilever beam accelerometer of claim 1, further comprising a trilaminar structure comprising two of said transduction elements that are conductively bonded to said metal beam, wherein said transduction elements contain metalized electrodes on active surfaces and have opposite polarity.

3. The series-connected cantilever beam accelerometer of claim 2, wherein said two proof-masses are substantially identical and conductively bonded to the transduction elements, wherein said two identical proof-masses are disposed in a substantially symmetrical manner to each other, wherein said two identical proof-masses each contain a flexible electrical conductor that is attached in advance of said conductive bonding and is used to measure an open-circuit output voltage that results when the trilaminar structure undergoes transverse bending.

4. The series-connected cantilever beam accelerometer of claim 1, wherein the relaxor-based piezoelectric single crystal transduction elements further comprise a binary formulation.

5. The series-connected cantilever beam accelerometer of claim 4, wherein the binary formulation further comprises one or more of <001> poled PMN-PT, <011> poled PMN-PT, and <110> poled PMN-PT.

6. The series-connected cantilever beam accelerometer of claim 4, wherein the binary formulation further comprises one or more of <001> poled PZN-PT, <011> poled PZN-PT, or <110> poled PZN-PT.

7. The series-connected cantilever beam accelerometer of claim 1, wherein the relaxor-based piezoelectric single crystal transduction elements further comprise a ternary formulation.

8. The series-connected cantilever beam accelerometer of claim 7, wherein the ternary formulation further comprises one or more of <001> poled PMN-PIN-PT, <011> poled PMN-PIN-PT, and <110> poled PMN-PIN-PT.

9. The series-connected cantilever beam accelerometer of claim 7, wherein the ternary formulation further comprises one or more of <001> poled PZN-PZ-PT, <011> poled PZN-PZ-PT, and <110> poled PZN-PZ-PT.

10. A parallel-connected cantilever beam accelerometer comprising:
    a metal beam;
    two proof masses, wherein said two proof-masses are positioned substantially close to a free-end of the metal beam; and
    two relaxor-based piezoelectric single crystal transduction elements, wherein each of said transduction elements is conductively bonded to a corresponding proof mass and wherein said corresponding proof mass comprises an additional electrical connection to at least one electrical lead, such that said at least one electrical lead is indirectly electrically connected to said corresponding transduction element via said corresponding proof mass.

11. The parallel-connected cantilever beam accelerometer of claim 10, further comprising a trilaminar structure comprising two of said transduction elements that are conductively bonded to a-said metal beam, wherein said transduction elements contain metalized electrodes on active surfaces of said transduction elements and have the same polarity.

12. The parallel-connected cantilever beam accelerometer of claim 11, wherein said two proof-masses are substantially identical and conductively bonded to the transduction elements wherein said two identical proof-masses are disposed in a substantially symmetrical manner to each other, wherein said two identical proof-masses each contain a flexible electrical conductor that is attached in advance of said conductive bonding and subsequently electrically connected forming a first electrode, wherein a second electrode further comprises a flexible electrical conductor that is attached to the metal beam in advance of the conductive bonding in which the metal beam and piezoelectric plates are combined to form said trilaminar structure, wherein said electrodes are used to measure the open-circuit output voltage that results when the trilaminar structure undergoes transverse bending.

13. The parallel-connected cantilever beam accelerometer of claim 10, wherein the relaxor-based piezoelectric single crystal transduction elements further comprise a binary formulation.

14. The parallel-connected cantilever beam accelerometer of claim 10, wherein the binary formulation further comprising one or more of <001> poled PMN-PT, <011> poled PMN-PT, and <110> poled PMN-PT.

15. The parallel-connected cantilever beam accelerometer of claim 10, wherein the binary formulation further comprising one or more of <001> poled PZN-PT, <011> poled PZN-PT, and <110> poled PZN-PT.

16. The parallel-connected cantilever beam accelerometer of claim 10, wherein the relaxor-based piezoelectric single crystal transduction elements further comprise a ternary formulation.

17. The parallel-connected cantilever beam accelerometer of claim 10, wherein the ternary formulation further comprises one or more of <001> poled PMN-PIN-PT, <011> poled PMN-PIN-PT, and <110> poled PMN-PIN-PT.

18. The parallel-connected cantilever beam accelerometer of claim 10, wherein the ternary formulation further comprises one or more of <001> poled PZN-PZ-PT, <011> poled PZN-PZ-PT, and <110> poled PZN-PZ-PT.

* * * * *

UNITED STATES PATENT AND TRADEMARK OFFICE
CERTIFICATE OF CORRECTION

PATENT NO. : 8,915,139 B1  
APPLICATION NO. : 13/045969  
DATED : December 23, 2014  
INVENTOR(S) : James A. McConnell Page 1 of 1

It is certified that error appears in the above-identified patent and that said Letters Patent is hereby corrected as shown below:

In the claims

Column 6, In Claim 11, line 18, replace "a-said metal" with --said metal--.

Column 6, In Claim 14, lines 41 and 42, replace "further comprising" with --further comprises--.

Column 6, In Claim 15, lines 45 and 46, replace "further comprising" with --further comprises--.

Signed and Sealed this  
Twelfth Day of April, 2016

Michelle K. Lee  
*Director of the United States Patent and Trademark Office*